(12) United States Patent
Clark et al.

(10) Patent No.: US 6,974,113 B1
(45) Date of Patent: Dec. 13, 2005

(54) ADJUSTABLE FISHING ROD HOLDER AND MOUNTING TRACK ASSEMBLY

(75) Inventors: Richard N. Clark, Farmington Hills, MI (US); Jeffrey L. Clark, Commerce, MI (US)

(73) Assignee: Tecla Company, Inc., Walled Lake, MI (US)

( * ) Notice: Subject to any disclaimer, the term of this patent is extended or adjusted under 35 U.S.C. 154(b) by 0 days.

(21) Appl. No.: 10/748,862

(22) Filed: Dec. 30, 2003

Related U.S. Application Data (60) Provisional application No. 60/437,811, filed on Jan. 3, 2003, provisional application No. 60/437,871, filed on Jan. 3, 2003.

(51) Int. Cl.$^7$ ............................................. A01K 97/10
(52) U.S. Cl. ...................................... 248/538; 248/521
(58) Field of Search ................................ 248/520, 521, 248/523, 527, 538, 535, 514

(56) References Cited

U.S. PATENT DOCUMENTS

| | | | |
|---|---|---|---|
| 1,793,910 A * | 2/1931 | Cuthbert et al. | 211/69.7 |
| 1,985,985 A | 1/1935 | Gerline | |
| 2,037,709 A | 4/1936 | Doyle | |
| 2,458,881 A * | 1/1949 | Steuer | 248/514 |
| 2,851,234 A | 9/1958 | Scheifele | |
| 3,162,408 A | 12/1964 | Markman | |
| 3,193,964 A | 7/1965 | Hurst | |
| 3,304,036 A * | 2/1967 | Davis | 248/514 |
| 3,516,190 A | 6/1970 | Cook | |
| 3,708,141 A * | 1/1973 | Friedgen et al. | 248/515 |
| 3,929,365 A | 12/1975 | Hunt et al. | |
| 3,937,415 A | 2/1976 | Prinz | |
| 4,044,489 A | 8/1977 | Henze et al. | |
| 4,049,225 A | 9/1977 | Chasen et al. | |
| 4,064,811 A | 12/1977 | Copeland | |
| 4,093,171 A | 6/1978 | Mengo, Sr. | |
| 4,226,394 A | 10/1980 | Einhorn | |
| 4,248,002 A | 2/1981 | McNellis | |
| 4,551,939 A | 11/1985 | Kitchens | |
| 4,827,654 A * | 5/1989 | Roberts | 43/21.2 |
| 4,901,469 A | 2/1990 | Murray | |
| 4,948,083 A | 8/1990 | McNaney, Jr. et al. | |
| 5,040,759 A | 8/1991 | Wainwright | |
| 5,054,737 A | 10/1991 | DeLancey | |
| D332,299 S | 1/1993 | Dryna et al. | |
| 5,191,852 A | 3/1993 | Rupp | |
| 5,245,780 A | 9/1993 | Hansen et al. | |
| 5,259,774 A * | 11/1993 | Gabrius | 439/110 |

(Continued)

*Primary Examiner*—Robert P. Olszewski
*Assistant Examiner*—A. Joseph Wujciak
(74) *Attorney, Agent, or Firm*—Reising, Ethington, Barnes, Kisselle, P.C.; William J. Waugaman (57) ABSTRACT

Adjustable holder apparatus for holding a trolling fishing rod in various upright orientations on a boat-mounted track. The apparatus includes a track-mounted base plate, a pivot bracket on the base plate, and a rod holder for detachably mounting and cantilever supporting the rod upright on the holder. A locking gear is fixed to the holder and pivotally secured to the bracket by a pivot pin for supporting the holder on the base plate for pivotal motion of the fishing rod for pivotally raising and lowering the rod. The gear has a circumferentially extending row of locking teeth arrayed in the holder pivot plane. A locking handle mechanism includes a locking pin bodily movable by the mechanism into and out of locking engagement with a selected root space between any two of the locking teeth for adjustably holding said holder in selected angularly spaced positions in the pivot plane.

13 Claims, 5 Drawing Sheets

U.S. PATENT DOCUMENTS

| | | | |
|---|---|---|---|
| 5,367,815 A * | 11/1994 | Liou | 43/21.2 |
| 5,369,971 A | 12/1994 | Sheppard | |
| 5,374,024 A * | 12/1994 | Williams | 248/514 |
| 5,438,789 A | 8/1995 | Emory | |
| 5,445,102 A | 8/1995 | Rupp | |
| 5,588,630 A * | 12/1996 | Chen-Chao | 248/514 |
| 5,756,912 A | 5/1998 | Liao | |
| 5,761,844 A | 6/1998 | Horschel | |
| 5,871,196 A | 2/1999 | Martelli | |
| 6,037,538 A | 3/2000 | Brooks | |
| 6,089,524 A * | 7/2000 | Lai | 248/535 |
| 6,162,104 A | 12/2000 | White | |
| 6,266,850 B1 | 7/2001 | Williams et al. | |
| 6,591,541 B1 | 7/2003 | Cummings | |

\* cited by examiner

ADJUSTABLE FISHING ROD HOLDER AND MOUNTING TRACK ASSEMBLY

This is a United States regular utility patent application filed pursuant to 35 U.S.C. §111 (a) and claiming the benefit of the priority under 35 U.S.C. §119 (e)(1) of U.S. provisional application Ser. No. 60/437,811 and U.S. provisional application No. 60/437,871, both filed Jan. 3, 2003.

FIELD OF THE INVENTION

This invention relates to fishing equipment designed for trolling from a moving boat, primarily for use in deep water sport and commercial fishing, and more particularly to devices for removably holding trolling fishing rods that are pivotally adjustable about both generally horizontal and vertical pivot axes.

BACKGROUND OF THE INVENTION

Fishing is one of the oldest vocations and avocations. In the last fifty years or so the equipment and fishing techniques have evolved into increasingly sophisticated products and strategies for catching fish. Bait fish seek water at a certain temperature and water depth. The big fish follow them to feed on them. Numerous electronic devices have been provided to detect water temperature variations at different depths, to locate schools of fish at different locations and to provide a read-out of underwater topography where fish congregate. Modern trolling motors allow both large and small fishing and commercial boats to move at slow and controlled trolling speeds through the water.

It is preferred to equip trolling boats with the ability to fish with more than one fishing rod at a time in order to multiply the number of possibilities for catching fish simultaneously or in close sequence to thereby increase the chances of catching fish. Fishing boats are often equipped with mounting tracks along their port and starboard gunnels and across the transom top board to thereby enable fishermen to use more than one fishing rod, because many rod holders will fit into the track. Usually the track is mounted to the boat permanently. When so equipping fishing boats for use with multiple fishing rods deployed, it is necessary to be able to adjust the holders into which the fishing rods are telescopically inserted, handle end first, so that their respective fishing lines deployed from the tips of these rods do not interfere with each other. Moreover, different fishing techniques require that the fishing rods be tilted at different angles about both vertical and horizontal pivotal axes of rotation, as in dipsy fishing where it is desirable to have the rod extended at an angular range about a horizontal axis ranging from a vertical or upright position to a full-down position parallel to the water surface. The ability to adjust the angle of repose of the fishing rod while removably mounted in a holder greatly facilitates use of a variety of different fishing lures as well as trolling devices such as planer boards, and also accommodates various trolling techniques.

Although hitherto a variety of different types of fishing rod holders have been provided in an attempt to accommodate most if not all of the aforementioned usage parameters, there remains much room for improvement in such devices. For example, there is a need to improve the ease with which the rod holder can be adjusted both about a vertical pivot axis as well as a horizontal pivot axis and to be held securely at any adjusted selected position in the angular range of such pivotal movement. There is also a need for improvement in the locking system provided in the rod holder device from the standpoint of strength and elimination of play and slop in the various locked positions of the device.

There is also a need for a ratcheting type rod holding device that would allow the rod holder tube to pivot about a horizontal axis and be quickly pulled upwardly through a range of locking positions, and yet locked against down movement when released to set the holder at the desired angular inclination. Such a device would enable the rod holder to be quickly pulled up by the fisherman to make it easier for the fisherman to get his fishing rod out of the holder when a fish strikes, but also which would securely retain a given angular rod attitude if a fish strikes while the rod is in the holder.

There is also a need to provide an improvement in the ability to track mount the holder and to provide a track configuration cooperative with the holder base that would enable the rod holder mechanism to be removed easily after use and stored in a secure location out of the weather and thus protected from salt water corrosion and contamination. There is also a need to provide a reliable means for retaining the fishing rod in the holder that is simple and adjustable.

With all of these needs there still remains the overall need that these needs be met with an improved rod mounting and locking mechanism that is strong enough to take the loads of big fish and heavy sinkers on the fishing lines even when trolling at relatively fast deep sea sport and commercial fishing speeds.

OBJECTS OF THE INVENTION

Accordingly, among one or more objects of the present invention are to provide an improved fishing rod holder for removably receiving a fishing rod handle-end-first that satisfies all of the foregoing needs with a strong, corrosion-resistant structure that is economical to manufacture and assemble, that is adjustable to provide a variety of angular positions of repose of the fishing rod about both generally horizontal and generally vertical pivotal axes, that is releasably lockable in a range of positions through each of these angular ranges of pivotal motion, that is very strong and wear resistant, that is easily latched and unlatched from lock positions, that is designed to compensate for wear of the locking mechanism parts and to eliminate play in locked positions, that provides an attachment between the fishing rod and the holder in the form of a bungee cord that serves as a safety feature to prevent the fishing rod from being pulled from the holder when unattended, and that provides a mono-leaf biasing spring in the locking mechanism that is simple in construction, compact, easy to mount and provides a uniform application of force to bias a locking pin in the mechanism squarely into engagement with a locking tooth.

Another object is to provide an improved adjustable holding and mounting mechanism of the foregoing character that is adaptable to a number of applications other than as a fishing rod holder, i.e., applications that call for pivotal motion with locking and unlocking in a range of positions, as in adjustable seatbacks, seat bottoms, armrests as well as adjustable tables or platforms and the like that would be enhanced by the improvement features of the present invention.

BRIEF DESCRIPTION OF THE DRAWING FIGURES

The foregoing as well as further objects, and also features and advantages of the present invention, will become apparent from the following detailed description of the best mode presently known to the inventors of making and using the invention as well as from the accompanying drawings (which are drawn to engineering scale unless otherwise indicated), wherein.

DETAILED DESCRIPTION OF THE PREFERRED EMBODIMENTS

Figures 1, 2:
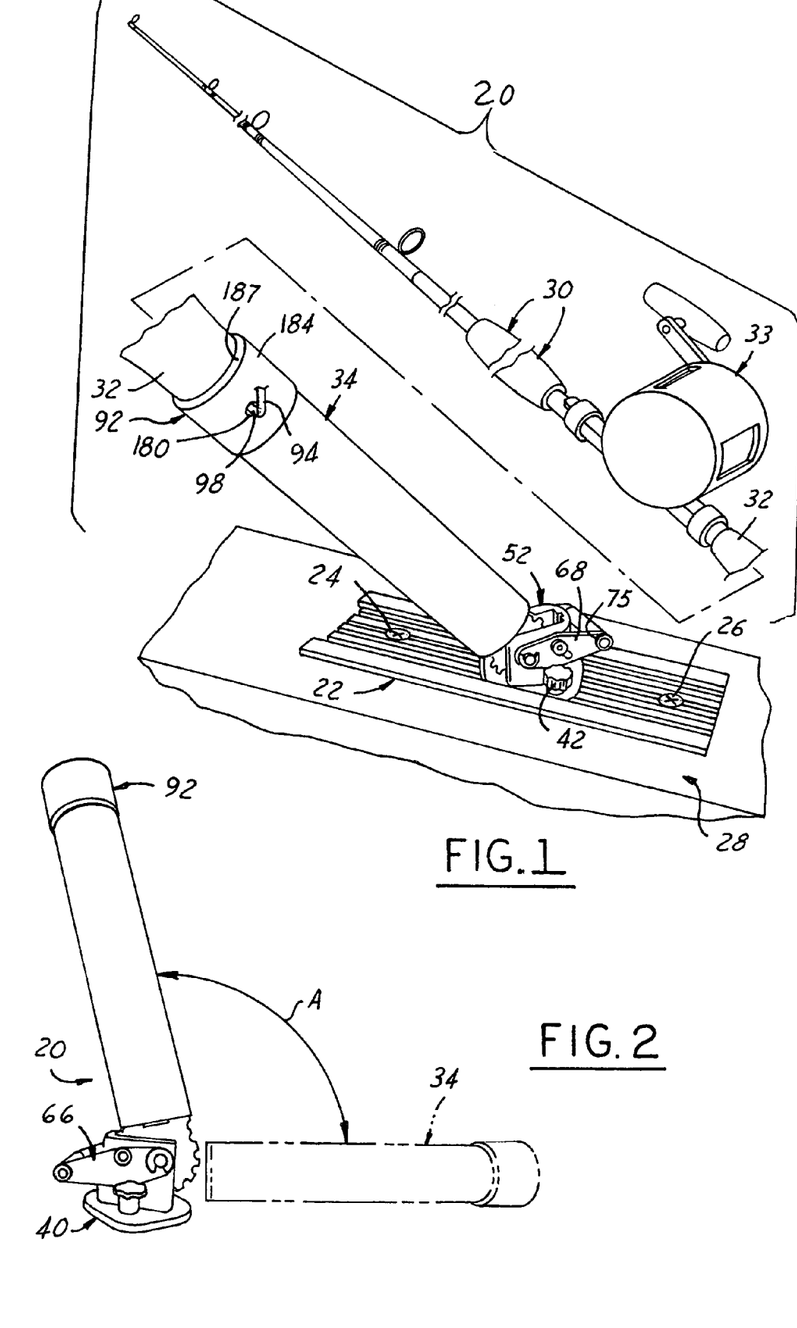
FIG. 1 is a fragmentary perspective and partially exploded view of a conventional trolling fishing rod removably mounted telescopically, handle-end-first, into the holding tube of a presently preferred but exemplary embodiment of an improved track-mounted and universally adjustable fishing rod holder of the present invention.
FIG. 2 is a perspective view of the adjustable fishing rod holder of FIG. 1 shown separately from the track and, in solid lines, locked in an upright position at the upper end of its pivotal range of vertical angular motion and also shown, in phantom lines, re-positioned parallel to the water surface, thereby illustrating the angular range of travel "A" of the holder about a generally horizontal pivot axis.

Referring in more detail to the accompanying drawings, FIG. 1 illustrates the improved adjustable fishing rod holder assembly 20 of the invention releasably and adjustably mounted to a mounting track 22 of the invention, track 22 in turn being mounted by suitable fasteners 24 and 26 to a gunnel 28 of an associated fishing boat (not otherwise shown). A conventional trolling fishing rod 30 has its lowermost handle 32 telescopically inserted handle-end-first fully into a holder tube 34 of holder assembly 20.

As illustrated in FIG. 2, holder tube 34 may be adjustably swung about a generally horizontal pivot axis between an end-limit upright position shown in solid lines and an end-limit lowered (substantially horizontal) position shown in phantom, and thus through a pivotal range of travel "A" of about 100°. As shown, holder assembly 20 is operable for providing rod-up ratcheting action and rod-down locking in any selected one of five positions spaced at generally equal angular increments. Tube 34 thus may be swung from the horizontal position (phantom lines) through angular travel range "A" all the way up to the upright position (solid lines) with a ratcheting action without manually operating the locking handle for releasing the locking mechanism, as will be described in more detail hereinafter.

Figure 3:
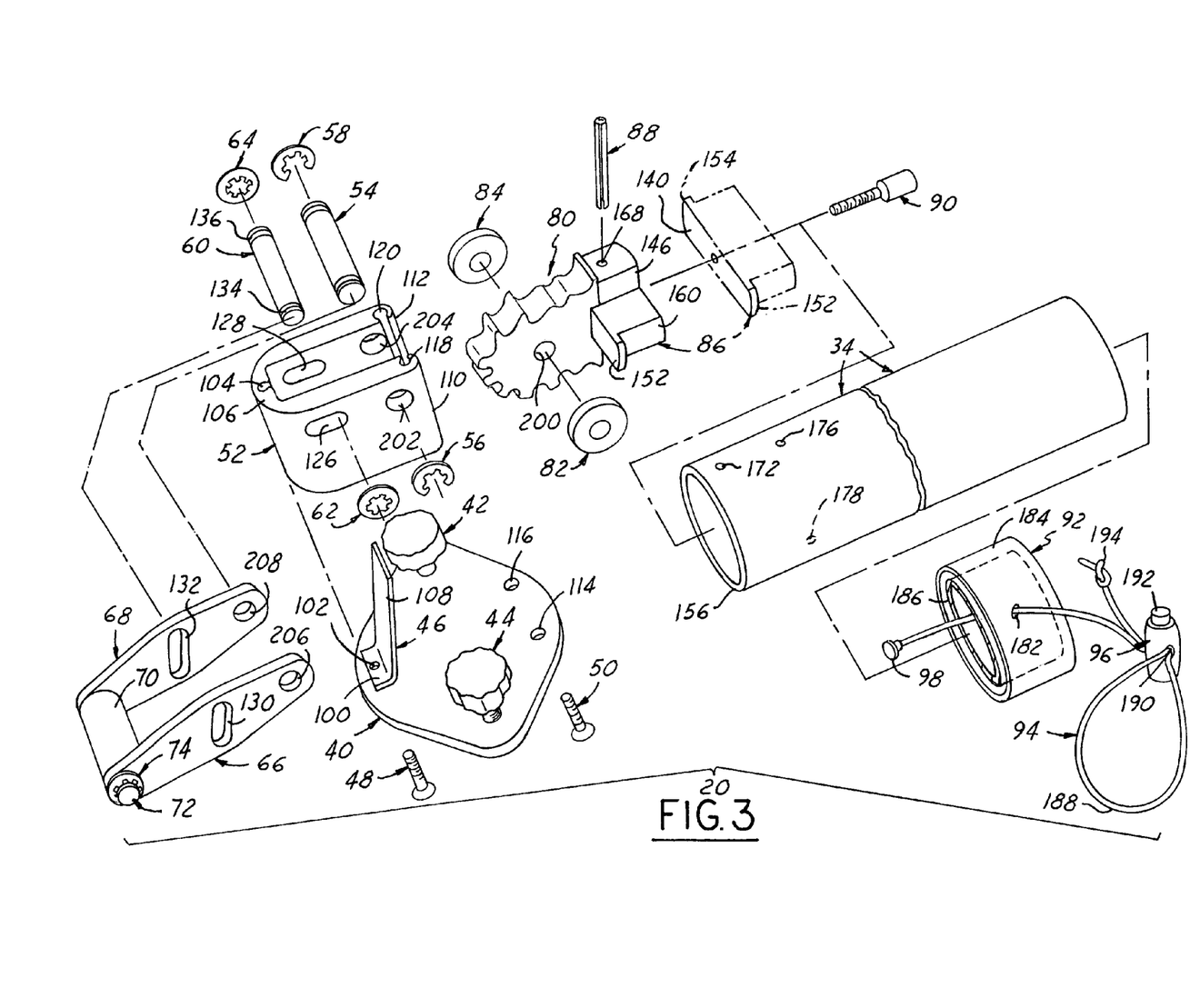
FIG. 3 is an exploded perspective view of the adjustable fishing rod holder of the invention to better illustrate the construction and assembly of its component parts as used in the preferred form of FIGS. 1 and 2.

Referring to FIG. 3, holder assembly 20 is shown in exploded perspective format and comprises the following components:

NAME OF COMPONENT DRAWING REFERENCE NUMERAL

1. Base Plate 40
2. Lock Knobs (2) 42, 44
3. Flat Mono-Leaf Spring 46
4. U-Bracket Mounting Screws (3) 48, 50
5. U-Bracket 52
6. Unlocking Handle Pivot Pin 54
7. Pivot Pin Retaining C-Clips (2) 56, 58
8. Locking Pin 60
9. Locking Pin Retaining Spring Finger Clips (2) 62, 64
10. Unlocking Handle Arms (2) 66, 68
11. Unlocking Handle Grip Tube 70
12. Unlocking Handle Tube Pin 72
13. Unlocking Handle Tube Pin Retaining Clips (2) 74, 75
14. Dual Action Ratchet/Locking Gear Subassembly 80
15. Locking Gear Spacer Washers (2) 82, 84
16. Locking Gear Cross Arm 86
17. Split-Sleeve Locking Gear Retaining Pin (2) 88
18. Locking Gear Cross Arm Mounting Screw Pin 90
19. Fishing Rod Holder Tube 34
20. Rod Holder Vinyl End Cap 92
21. Elastic Bungee Cord 94
22. Cord Loop Spring Clamp 96
23. Bungee Cord End Locking Ferrule 98

Assembling Fishing Rod Holder Assembly 20

Referring to FIGS. 3 through 9, the components enumerated with reference to FIG. 3 hereinabove may be readily manually assembled to provide the complete fishing rod holder assembly 20 by following the hereinafter described exemplary assembly sequence. Spring 46 is positioned on the upper surface of base 40 as shown in FIG. 3 with its angled foot tab 100 oriented with its screw hole 102 aligned with the screw hole (not seen) in base 40 for receiving associated self-tapping mounting machine screw 48. Screw 48 is inserted upwardly through this plate and spring tab hole to thereby temporarily position spring 46 as shown. Then U-bracket 52 is lowered into its assembled position shown in FIGS. 4 and 7–10. The extrusion-formed, screw-receiving, open-side channel 104 (see also FIG. 11) formed in the bight portion 106 of bracket 52 is thereby aligned coaxially with screw hole 102. The self-tapping machine screw 48 is then threaded upwardly into bracket channel 104 to initially secure bracket 52 onto base 40, while at the same time clamping spring 46 with its upwardly inclined leaf portion 108 disposed between the parallel side legs 110 and 112 of bracket 52. Then the two additional self-tapping machine screws 50 and 51 are respectively inserted upwardly through base holes 114 and 116 (FIG. 3) into the extrusion-formed channels 118 and 120 (also extrusion-formed in legs 110 and 112 respectively) to thereby complete the screw-mounting of bracket 52 to base 40. If desired, at this point, the threaded shanks of lock knobs 42 and 44 may be threadably started in their respectively associated threaded base plate holes 122 and 124 (FIGS. 3 and 11).

Then, while the upper end of leaf spring 46 is held deflected toward U-bracket bight 106, locking pin 60 is inserted through the coaxially aligned, horizontally elongated slots 126 and 128 provided in bracket legs 110 and 112 respectively. Then the upper end of spring 46 is released so as to allow it to spring forward and bear against pin 60 to drive the same to the right hand end of slots 126, 128 (as viewed in FIGS. 3, 4, 8 and 9).

Handle arm 66 may then be installed on bracket 52 by slipping its curved camming slot 130 over the protruding end of locking pin 60 to position arm 66 flat against the side of bracket leg 110. Likewise, handle arm 68 is positioned on the other side of bracket 52 against the outside surface of leg 112 by slipping the protruding end of locking pin 60 through the camming slot 132 in arm 68. The retaining clips 62 and 64 can then be slipped over the associated ends of locking pin 60 protruding outwardly from the arms and the clips individually registered and engaged with their associated locking grooves 134 and 136 in the end of pin 60 to thereby retain the arms initially on bracket 52. Then handle tube pin 72 may be inserted through the coaxially aligned holes in the swinging ends of arms 66 and 68, tube 70 first being held coaxially positioned therebetween to receive the pin 72 therethrough. Retaining clips 74 and 75 are then slipped into their respectively associated locking grooves in the protruding ends of pin 72 to thereby secure tube 70 and pin 72 in assembly with handle arms 66 and 68.

Figure 4:
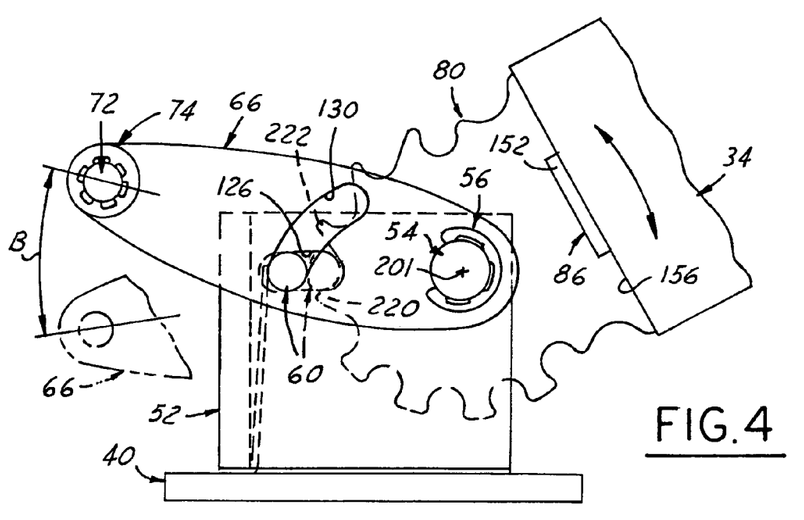
FIG. 4 is a fragmentary side elevation view illustrating the rod holder locking mechanism and the angular range of travel "B" (an arc of approximately 60° about pivot pin 54) of the locking handle between locked position (phantom lines) and unlocked position (solid lines) relative to the toothed locking gear of the holder assembly.
Figure 5:
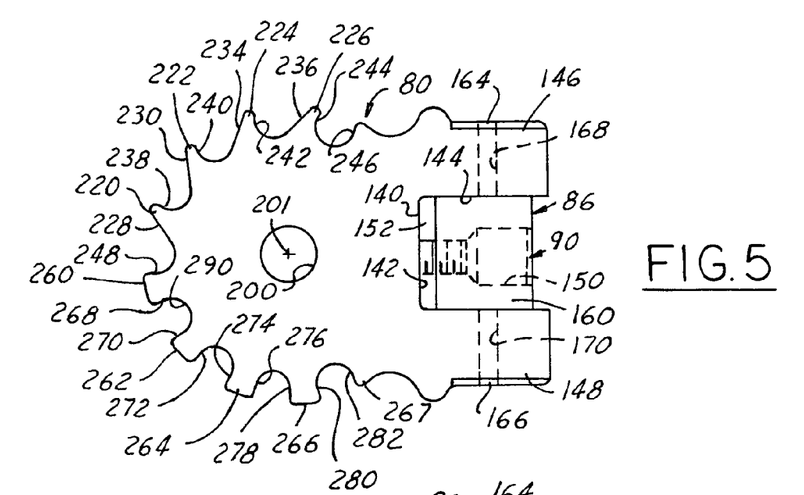
FIG. 5 is a side elevational view of a dual-mode (ratchet/non-ratchet) locking gear tooth assembly provided in accordance with the preferred embodiment of the invention illustrated herein.
Figure 6:
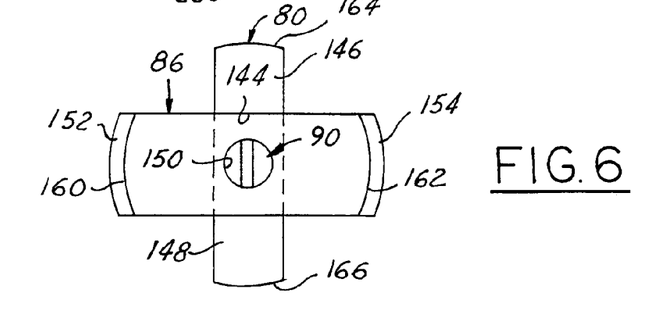
FIG. 6 is an end view of the locking gear tooth assembly of FIG. 5.
Figure 7:
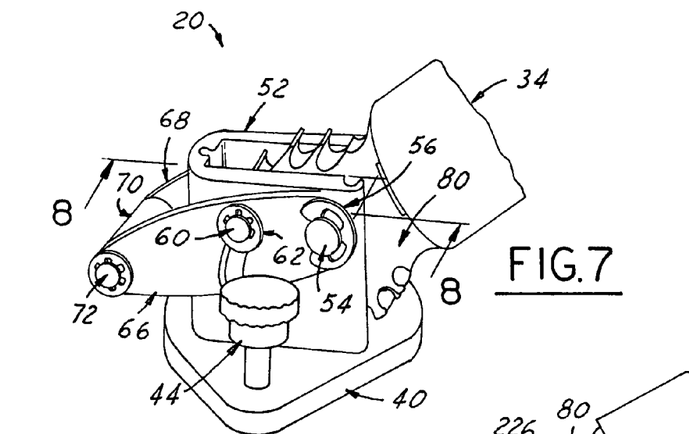
FIG. 7 is a fragmentary perspective view of the holder locking and mounting structure of the assembly shown by itself with the locking handle in locked position.

Next, as best seen in FIGS. 3 and 5, cross arm 86 is assembled to locking gear part 80 so that the end face 140 of cross arm 86 bottoms against the end face 142 of a central slot 144 defined between the legs 146 and 148 of gear tooth part 80. Then machine screw mounting pin 90 is inserted into the mounting hole 150 in cross arm 86 and threadably tightened down in an associated receiving threaded hole (not shown) provided in part 80 to thereby securely affix cross arm 86 to part 80. The subassembly of gear tooth part 80 and cross arm 86 is then inserted with a close clearance or press fit into the lower end of holder tube 34 until the wing tabs 152 and 154 of cross arm 86 abut the lower end edge 156 of tube 34 (FIGS. 3 and 4). As best seen in FIG. 6, the curved end surfaces 160 and 162 of cross arm 86 and the curved end surfaces 164 and 166 of legs 146 and 148 lie on a common imaginary circle having a diameter matching the inside diameter (for close or press fit) of tube 156 to thereby provide a secure, stable mounting fit of gear 80 in tube 34 and vice versa.

Bracket leg 146 is provided with a through hole 168 (FIGS. 3 and 5) for receipt of an associated roll pin 88 inserted in a hole 172 of tube 34 that is aligned with hole 168 in leg 146 to thereby pin-fasten gear tooth 80 with its cross arm 86 fixed in the lower end of tube 34. Another split roll pin (not shown), like pin 88, is inserted into another hole (not shown) in tube 34 located diametrically opposite hole 172 and then into hole 170 in leg 148 to complete the pin-fastening of subassembly 80/86 in the lower end of tube 34. Another pair of diametrically opposite holes 176 and 178 (FIG. 3) are provided in tube 34 located just clear of the inserted or installed position of the free ends of legs 146, 148 in assembly with tube 34. An alignment pin (not shown) is inserted coaxially through holes 176 and 178 and fixed in place in tube 34 to register with an alignment groove (not shown) in the lower end of rod handle 32 to thereby maintain fishing rod 30 properly angularly aligned when installed in holder tube 34 with fishing rod reel 33 upright for proper operator access.

Then, at the upper end of tube 34, a ferrule 98 is inserted through a hole 180 in the sidewall of tube 34 (FIG. 1) with the head of the ferrule inside and its shank protruding outwardly on the outside of the tube. Then the double wall flexible vinyl cap 92 is slipped telescopically onto the upper end of tube 34 until a hole 182 in the outer sidewall 184 of cap 92 registers with hole 180 in the tube and the shank of the ferrule pushed through cap hole 182. It is to be understood that cap 92 is made up of both the outer sleeve 184 as well as a concentric inner sleeve 186 joined integrally at their upper end by an annular web bight portion 187 (FIG. 1). For clarity of illustration in the drawings, web bight 187 is cut off in FIG. 3 and hence not shown therein. Cap sleeve 184 slips over the outside of tube 34 while cap sleeve 186 slips down the inside of tube 34, and the web bight 187 joining these sleeves covers the upper end edge of tube 34.

One end of the bungee cord 94 is inserted into the hollow shank of ferrule 98 and then the ferrule shank crimped to fasten that end of the cord to the ferrule and thus to tube 34. A loop 188 (FIG. 3) is then formed in cord 94 and a loop portion is squeezed together so that it can be pushed through the center opening 190 of cord spring clamp 96 and the registering interior slot in the spring biased clamp button 192 of clamp 96 to thereby form an appropriate size loop 188. A simple overhand knot 194 is tied in the other free end of cord 94 to thereby capture bungee cord 94 and clamp device 96 in assembly with tube 34.

Figure 8:
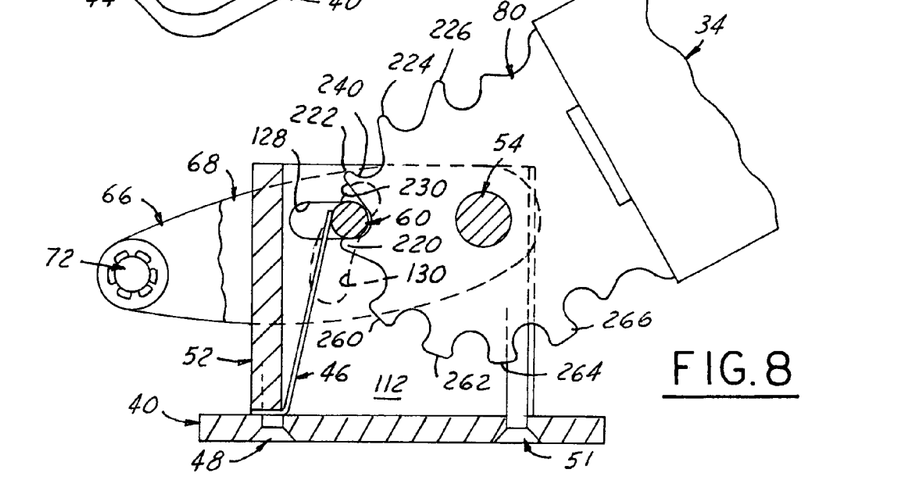
FIG. 8 is a part sectional, part side elevational view taken along the section line 8—8 of FIG. 7 showing the components in locked position and with the dual locking gear tooth assembly mounted in the holder bracket for ratcheting operation.

With the subassembly of gear tooth 80 and cross arm 86 secured into the lower end of tube 34, and with cap 92 and bungee cord 94 affixed to the upper end of the tube, these rod holder components are now ready for final assembly with the lock and latch subassembly of base 40, U-bracket 52, handle locking arms 66/68 and locking pin 60. To effect this, the tooth end of gear 80, along with a pair of flanking plastic spacer washers 82 and 84 (that are aligned with their center apertures coaxially registering with a pivot bore 200 of gear 80) are inserted between the bracket legs 110 and 112 until bore 200 coaxially registers with pivot bore holes 202 and 204 in bracket legs 110 and 112. Then pivot holes 206 and 208 in locking arms 66 and 68 respectively are likewise brought into coaxial registry with holes 200, 202 and 204. Then handle pivot pin 54 is inserted through this series of coaxially aligned holes to thereby pivotally secure the ends of arms 66 and 68 onto bracket 52, while at the same time pivotally mounting holder tube and gear tooth subassembly 34/80 on bracket 52. During this assembly process, locking pin 60 is registered into one of the root spaces between adjacent ratchet teeth of gear 80 as shown in FIG. 8.

Dual Mode Ratchet/Non-Ratchet Locking Gear 80

As best seen in FIG. 5, gear 80 is provided with a row of circumferentially spaced ratchet teeth 220, 222, 224 and 226, as defined respectively by tooth camming side surfaces 228, 230, 234 and 236 respectively on one tooth side, and on the tooth opposite sides by radially oriented locking side surfaces 238, 240, 242 and 244 also respectively associated with ratchet teeth 220, 222, 224 and 226. At the tube end of this row of ratchet teeth, the tooth surface 246 facing tooth surface 244 is a non-camming locking surface, i.e., it is generally radially oriented relative to the pivot axis 201 defined by the journal opening 200 of gear 80. The tooth surface 248 facing surface 228 is likewise a non-camming locking surface since it too is a generally radially oriented surface relative to axis 201. It will be noted that the ratchet locking teeth 220–226 occupy an arc on the circumference of gear 80 of about 110°.

On the other side of the free end circumference of gear 80 occupying a similar arc of about 110° is another row of non-ratchet locking teeth 260, 262, 264 and 266. The sidewalls 268 and 270 of teeth 260 and 262 are slightly divergent from a radius centered on axis 201 at equal divergent angles. The same is true of the sidewalls 272 and 274 of teeth 262 and 264, the sidewalls 276 and 278 of teeth 264 and 266 and the sidewalls 280 and 282 between tooth 266 and the end tooth formation 267. The distance between these sidewalls of locking teeth 260–267 is coordinated with the diameter of locking pin 60 so that pin 60 can enter between these teeth into locking relationship therebetween, but without bottoming or touching the root surface 290 defined in like manner between the mutually facing sidewalls of each of the non-ratchet locking teeth. This non-bottoming, sidewall seating feature ensures that there is no play in the rod holder once locked, while at the same time compensating for the effects of wear of the pin and the sidewalls during prolonged usage, so that this anti-play feature is preserved over a long operating life of the rod holder.

The engagement of locking pin 60 between any two adjacent ratchet teeth 220–226 likewise is a non-bottoming engagement as determined by the dimensional relationship set-up between the locking pin slot 126 at its right hand end as viewed in FIGS. 3, 4, 8 and 9 and the position of the root surface between any two such adjacent ratchet teeth. That is, pin 60 abuts or bottoms at the right hand end of slot 126 while still spaced slightly off the root surface between adjacent ratchet teeth. In this position the pin is designed to contact both the radial and inclined camming sidewalls in joining the root surface between such adjacent ratchet teeth so as to also lessen angular play in a ratchet lock position.

Track Mounting of Rod Holder Assembly 20

Figure 10:
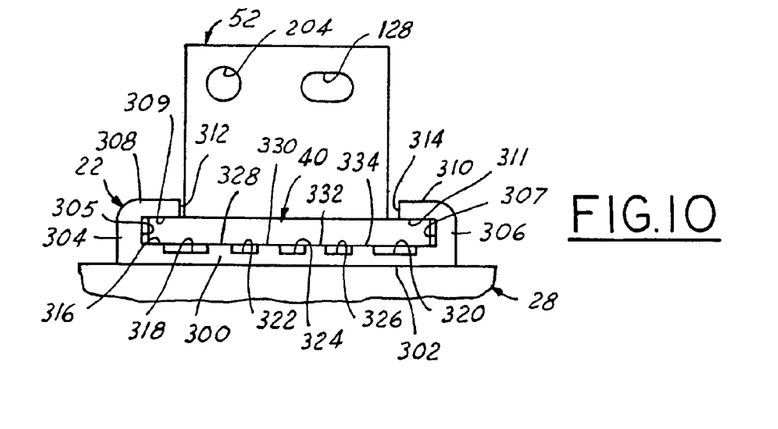
FIG. 10 is a fragmentary view showing an end elevation of the holder mounting track with the U-bracket and base plate subassembly of the holder assembly mounted in the mounting track affixed to the boat structure, and with the bracket and base plate oriented as shown in FIG. 12.
Figure 11:
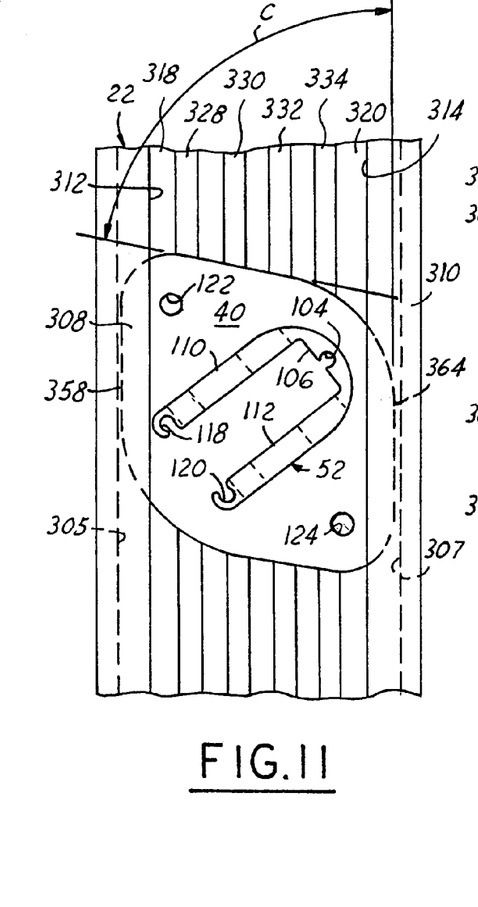
FIG. 11 is a top plan view of the U-bracket and base plate subassembly of the holder assembly shown mounted in the track and oriented at one extreme limit of its angular range of pivotal motion about a vertical axis.
Figure 12:
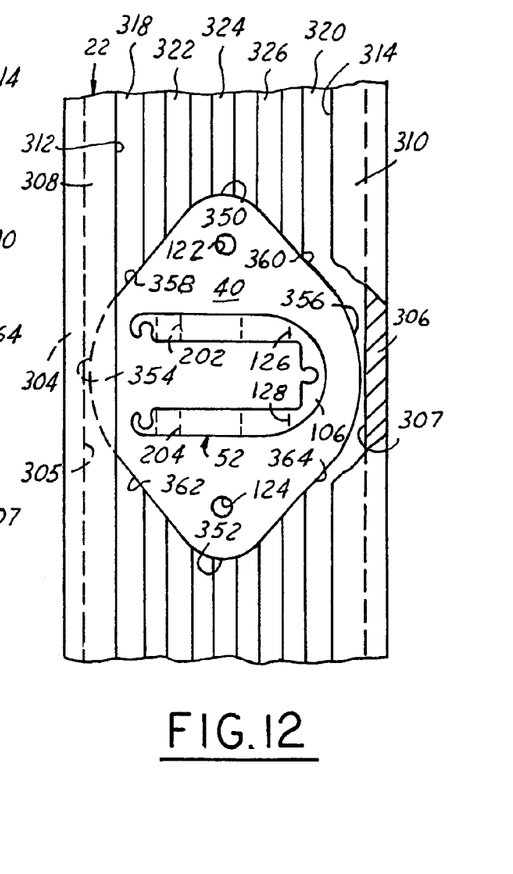
FIG. 12 is a fragmentary plan view similar to FIG. 11 but showing the base plate and U-bracket subassembly oriented with the centerline axis of its two locking bolts oriented parallel to the centerline axis of the track, the U-bracket thus being oriented for holding the rod holder with its longitudinal axis perpendicular to the track longitudinal axis.

As best seen in FIGS. 1 and 10–12, rod holder assembly 20 is preferably track mounted to gunnel 28 or the like of a trolling fishing boat utilizing a specially constructed track 22 best seen in FIGS. 10–12. Track 22 preferably is made as an extrusion and comprises a base portion 300 having a flat bottom surface 302 and flanked by laterally opposite upright sidewall portions 304 and 306 that terminate at their upper edge at in-turned lips 308 and 310. The mutually facing end edges 312 and 314 of lips 308 and 310 respectively are spaced apart a distance slightly greater than the maximum horizontal dimension of U-bracket 52, as best seen in FIG. 10. The upper surface 316 of base portion 300 is made up of a series of parallel alternating grooves and lands comprising two laterally outermost grooves 318 and 320 and three narrower intermediate grooves 322, 324 and 326, thereby defining lands 328, 330, 332 and 334 respectively between grooves 318 and 322, 322 and 324, 324 and 326, and 326 and 320. The upper surfaces of lands 328, 330, 332 and 334 are coplanar with one another and with the end edges of upper wall 316 of base portion 300. The undersurfaces of lips 308 and 310 are spaced above the upper surface 316 of the base portion by a distance designed to receive the thickness of base plate 40 with a relatively close clearance sliding fit, as best seen in FIG. 10. The undersurface of base 40 thus is adapted to slide along the lands 328–334 and on the portions of surface 316 disposed at its outer lateral edges beneath lips 308 and 310.

As best seen in FIGS. 11 and 12, the configuration of base 40 in plan view is a modified diamond or "oblong" shape with thumb screw mounting holes 122 and 124 aligned along the major axis of base 40. The major longitudinal axis of bracket 52 is oriented perpendicular to the major axis of base 40. The ends of base 40 along its major axis are curved with a minor radius of curvature to provide curved ends 350 and 352. The ends of the base plate 40 intersected by its minor axis are curves 354 and 356 having a larger radius of curvature and which are coincident with an imaginary circle whose diameter is only slightly less than the distance between the interior surfaces 305 and 307 of lips 304 and 306 respectively. The design dimensional expansion of base plate 40 beyond this imaginary circle outwardly to the major axis curved ends 350 and 352 provides space for positioning locking knobs 42 and 44 on base 40 alongside U-bracket 52. Rounded end 350 is connected by tangential straight edge surfaces 358 and 360 with curved edges 354 and 356 respectively, and rounded end 352 is connected by tangential straight edge surfaces 362 and 364 with curved edges 354 and 356 respectively (FIG. 12).

It will thus be seen that base 40 is capable of rotation while being constantly captured by lips 308 and 310 against upward release from the track, and can be rotated through angle C (FIG. 11), i.e., rotation about a horizontal axis through a total angular range of approximately 70°, i.e., from 35° clockwise beyond the FIG. 12 mid-position orientation (not shown) counterclockwise to the end limit orientation of FIG. 11 where base straight edge 358 abuts sidewall interior surface 305 and base straight edge surface 364 abuts sidewall interior surface 307. Thus base 40 also can be rotated from its FIG. 11 end limit orientation in a clockwise direction through a total angular range of 70° to the other end limit orientation (not shown) wherein base straight edge 360 abuts sidewall interior surface 307 and base edge surface 362 abuts sidewall interior surface 305. In the one end-limit position of angular range of rotation of base 40 shown in FIG. 11, the threaded hole 122 for receiving locking thumb screw 44 is aligned with groove 318 adjacent land 328. Likewise, in this orientation the base through-hole 124 for threadably receiving locking thumb screw 42 is aligned with groove 320 adjacent the edge of land 334. Thus, by screwing down thumb screws 42 and 44, the protruding lower ends of these thumb screws will bottom in grooves 318 and 320 respectively. Upon continued threading down of the thumb screws, base plate 40 will be raised upwardly to bear tightly against the undersurfaces 309 and 311 of lips 308 and 310 to thereby firmly lock base 40 against clockwise rotation out of this one end-limit position on track 22.

If it is desired to angularly shift the orientation of base 40, thumb screws are threaded upwardly until their lower ends are flush with the undersurface of base 40 and thereby are fully withdrawn from the track grooves. If the base 40 is rotated 35° from the FIG. 11 to the FIG. 12 mid-position, the thumb screws will now align with the center groove 324. Further screwing down of these thumb screws raises the base plate until it is firmly locked in the position of FIG. 12. When base 40 is fully rotated clockwise to the extreme right hand end limit position (not shown), thumb screw openings 122 and 124 will at that point be aligned with grooves 320 and 318 respectively. Grooves 322 and 326 provide two additional intermediate angular locking positions of base 40. In this manner, it will be seen that base 40 provides a range of angular adjustment about a vertical axis of approximately 160° (2×C) and provides five circumferentially spaced locking orientations in its angular range of travel in rotating about a generally vertical axis. Base 40 can also be readily removed from one rail 22 and reverse mounted on another rail 22 so that the open end of bracket 52 then faces legs 310 to facilitate rod shifting between port and starboard side positions on the boat.

By having the screws engage the bottom surface of the grooves 318–326 rather than the upper surfaces of lands 328–334, the thumb screw threaded shanks do not mar or scratch the upper surfaces of the lands so that the same remain as smooth sliding surfaces for easy sliding adjustment of the base 40 longitudinally along track 22 to any desired position. In addition, having the thumb screws engage grooves provide a very secure retention against the base being loosened by high torque forces exerted about the vertical axis tending to alter the rotational adjustment of base 40 on track 22.

Operation of Adjustable Rod Holder Assembly 20 Mounted on Track 22

Adjustment of the angle of repose of fishing rod 30, when mounted in holder tube 34, can be readily and rapidly accomplished in a safe and secure manner through the operation of holder assembly 20 in cooperation with track 22. First of all, rod 30 is easily mounted in holder tube 34 by sliding the rod handle 30 bottom end first into the tube until the angular orienting slot normally provided at the bottom end of handle 32 engages the orienting pin inserted through holes 176 and 178 of holder 34, as described previously. Rod 30 may be retained against unintended pull-out from holder 34 by the bungee cord 94. Bungee cord loop 188 is readily adjustable due to provision of locking device 96. Handle 32 is inserted through the loop before insertion into the upper end of holder 34, the loop being tightened down on handle 32 by moving clamp device 96 toward the end of the loop.

Ratchet Mode of Vertical Adjustment of Rod Holder Assembly 20

With rod holder 34 and associated locking gear 80 installed in U-bracket 52 as shown in FIGS. 1, 2, 3, 4, 7 and 8, a ratcheting mode of operation is thereby provided in the vertical adjustment of rod holder assembly 20. In the ratcheting mode, it will be seen by comparing FIGS. 4 and 8 that in the locked position of FIG. 8, locking pin 60 is driven to a seated position between ratchet teeth 220 and 222 by the biasing force exerted by leaf spring 46. In this locked condition, locking arms 66 and 68 are in their lower end-limit or locking position, and are maintained in this position by the spring biased force of pin 60 cam acting in the curved cam slot 130.

If it is desired to raise or elevate rod 30 quickly, the rod and/or holder tube 34 can be gripped and manually swung in a counterclockwise direction, as viewed in FIGS. 4 and 8, which will cause the ratchet tooth camming surface 230 to slidably force pin 60 to the left, as viewed in FIGS. 8 and 4. This motion in turn causes pin 60 to bear against the left hand edge of cam slots 130 and 132, thereby also raising arms 66 and 68 toward the fully unlocked position shown in FIG. 4. As soon as pin 60 rides up over the crest of tooth 222, spring 46 will tend to drive it back into the root space between ratchet teeth 222 and 224. If the pole raising force is released at this point, rod 30 will have been raised one notch, corresponding to about a 35° change in elevation. However, if upward raising forces continue to be manually exerted on fishing rod 30 and/or holder tube 34, pin 60 will continue being successively ratcheted over tooth 224 and then over 226 until it reaches the end-limit and seats in a notch defined by the juxtaposed radial locking surfaces 244 and 246 (FIG. 5). The generally radial angulation of surface 246 prevents further counterclockwise rotation of gear 80 and hence further raising of rod 30.

If it is desired to elevate rod 30 without using the ratcheting mode of operation, then locking handle arms 66 and 68 are raised by gripping the finger grip tube 70 and exerting an upward pull on the same, thereby pivoting the arms from their locked position shown in FIG. 8 (and in phantom in FIG. 4) to their unlocked position shown in solid lines in FIG. 4. This pivots the arms through the angular unlocking range "B" labeled in FIG. 4. As arms 66 and 68 are so lifted the right hand edge of cam slot 130 (as viewed in FIGS. 4 and 8) cams pin 60 from its locking seated position between teeth 220 and 222 to its released position shown in FIG. 4. In this position pin 60 clears the outer edge of the ratchet teeth 220–226 and thus does not interfere with rotation of rod 30 about pivot axis 201 in either an up or down direction (counterclockwise or clockwise). When rod 30 has been so swung to a desired attitude of repose, thereby juxtaposing pin 60 between the selected ratchet teeth corresponding to this angle of rod repose, handle bar 70 is released, thereby allowing spring 46 to drive pin 60 into locking engagement between these ratchet teeth.

When it is desired to lower rod 30 from an elevated position downwardly, by clockwise rotation of gear 80 as viewed in FIGS. 4 and 8, locking handle 66/68 is gripped and pulled upwardly to pull pin 60 out of locking engagement with whichever tooth pair it has been engaged. This release action allows rod 30 to be lowered. If the locking handle is held up continually, the rod can be lowered all the way down to its substantially horizontal position wherein pin 60 registers with the end-limit locking root surfaces 248 and 228.

Swivel Adjustment of Fishing Rod 30 on Holder Assembly 20

From the previous description of base 40 mounted in track 22 in conjunction with FIGS. 10, 11 and 12, it will be seen that fishing rod 30 can be rotated about a vertical axis through an angular range "C" of approximately 70°, or 35° either side of a mid-position shown in FIG. 12 wherein the rod longitudinal axis is perpendicular to the longitudinal axis of track 22 (i.e., thus usually generally perpendicular to the fore and aft centerline of the fishing vessel when the track is side-gunnel mounted). Operation of the thumb screws 42 and 44 provides quick and secure locking of the rod in five angularly spaced positions in this 70° range of angular swivel adjustment, as described previously.

Non-Ratcheting Locking Mode of Vertical Adjustment of Fishing Rod Holder 20

The convertible dual mode feature of holder assembly 20 of the invention is best understood by comparing the operation of ratcheting adjustment described hereinabove in conjunction with FIGS. 1–4 and 7 and 8 with the converted mounting of holder tube 34 and gear 80 shown in FIG. 9. Note that in the assembly of locking gear 80 in U-bracket 52, the gear has been "flipped over", i.e., rotated 180° about the longitudinal axis of holder tube 34, so that the locking teeth of gear 80, namely teeth 260–266, are now uppermost and arrayed for selected locking engagement with locking pin 60. Due to the generally radial orientation of the sidewalls of these locking teeth described in conjunction with FIG. 5 hereinabove, rotational torque applied to gear 80 about pivot pin 54 (axis 201) cannot cam pin 60 out of locking engagement between any selected pair of the locking teeth 260–266. It is therefore required, in order to unlock gear 80 for elevational adjustment of rod 30, either upwardly or downwardly, to manually operate locking handle arms 66, 68 by pulling upwardly on handle tube 70 to move the locking handle from its locked position in FIG. 9 to an unlocked position (corresponding to the solid line position of handle arms 66 and 68 shown in FIG. 4) to thereby cam pin 60 out of registry with the locking teeth, against the biasing force of spring 46. When pin 60 is registered with another selected locking tooth space, the locking handle is released, thereby allowing pin 60 to be snapped back into registry with the associated locking teeth by the strong biasing force exerted by spring 46. The handle arms 66 and 68 are simultaneously returned by this spring bias to their locked position in FIG. 9 due to the camming action of pin 60 acting on the right hand edges of cam slots 130 and 132.

Further Features and Advantages

From the foregoing it will now be apparent that the adjustable fishing rod holder and track construction of the invention described hereinabove amply fulfills the aforestated objects and provides many advantages and features over the prior art.

Rod holder 20 can be track mounted and readily adjusted longitudinally along track 22 as well as swivel adjusted on the track. Using this track mount allows the fisherman to use more than one fishing rod because many rod holders will fit into track 22. Preferably track 22 is permanently mounted to the boat gunnel or other suitable location. With multiple rods so mounted on one track it is necessary to adjust the plurality of rod holders 20 so that the associated fishing lines will not interfere with each other. The easy adjustment of holder 20 about both horizontal and vertical axes renders this readily achievable. Vertical adjustment is easily done with the set of handle levers 66, 68 that allow engagement into, and force release of pin 60 from, locking gear 80. This gear lock system provides a very strong set-up with minimum play of the components in locked position.

The dual mode convertible nature of the holder assembly between ratchet and non-ratchet locking modes (FIG. 8 versus FIG. 9) enables the holder tube 34 and rod 30, when installed in the ratcheting mode of FIG. 8, to be pulled up easily through the sequential locking positions. However, when the handle is released allowing the locking pin 60 to be lock engaged, the rod holder tube is held against downward motion by the locking relationship of the ratchet tooth with the pin. This allows the rod holder tube 34 to be rapidly pulled up by the fisherman to make it easier for the fisherman to get his fishing rod 30 out of holder 34 when a fish strikes. However, if a fish strikes while the fishing rod is being held only by holder 34, the rod holder will stay in locked position against the downward pull of the fishing line.

Figure 9:
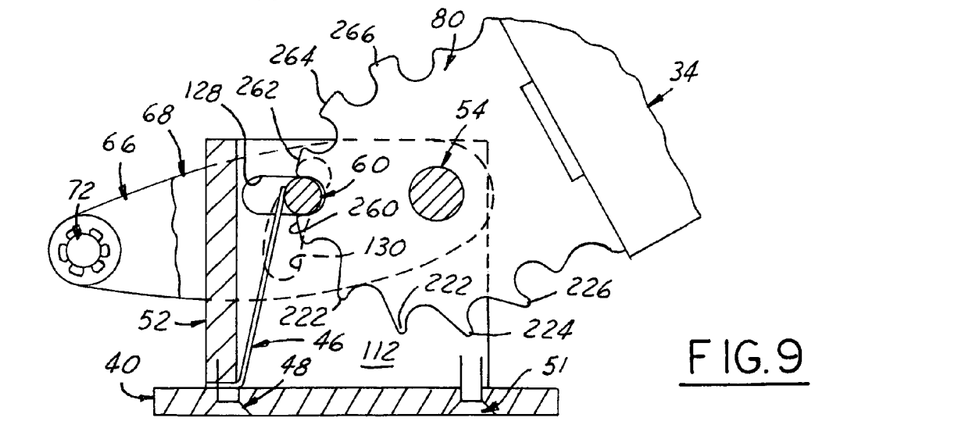
FIG. 9 is a view similar to FIG. 8 but showing the dual locking gear tooth assembly reversely mounted ("flipped" or rotated 180° about its longitudinal axis) for the non-ratcheting locking mode of operation of the holder assembly.

Nevertheless, because some fishermen want their rod holders to lock in both directions, holder assembly 20 provides the aforementioned convertible mounting feature, merely requiring holder 34 to be flipped over and remounted in bracket 52 so that locking pin 60 engages with non-ratcheting (full locking) teeth (FIG. 9). This conversion between ratchet mode and non-ratcheting locking mode is easily accomplished merely by removing the pivot pin 54, extracting gear 80 and rod holder tube from U-bracket 52, rotating the same 180° about its longitudinal axis and then reinstalling the tube and putting pin 54 back in place through the bracket and gear.

It is also to be understood that locking gear 80 may be provided solely with ratcheting locking teeth, or solely with non-ratcheting locking teeth, and such teeth located on both operative sides of the gear, or only on one operative side of the gear if the convertible mounting feature is not desired for certain applications.

Adjustment of fishing rod 30 horizontally by pivotal motion about a vertical axis is easily done by loosening locking screws 42 that clamp base 40 into track 22, then rotating base 40 to one of the desired angular settings and then re-tightening knobs 42 and 44 into engagement with the selected track groove. Another desirable feature of track mounting of rod holder assembly 20 is that the rod holder assembly can be removed after use and stored in a secure location out of the weather and exposure to salt water corrosion and solidified salt build-ups.

The bungee cord provided as shown in FIG. 3 enables the fishing rod 30 to be securely held in the fishing rod holder 34 with a readily adjustable retaining loop 188 and spring clamp 96 that allows the loop to be both snugged up and released quickly.

It will also be evident from the foregoing description and the drawings that rod holder assembly 20 is constructed with rugged dimensional relationships, and when constructed to the scale of the drawings provides vertical and horizontal locking mechanisms that are strong enough to take the loads of big fish and heavy sinkers on the fishing lines.

The anti-wear feature provided by designing locking pin 60 to lock in the center of the selected tooth space, such that the locking pin cannot engage the bottom or root face between the selected gear teeth, ensures minimal vertical rotational movement or "play" of the fishing rod 30 when in locked position. Wear compensation is also thereby achieved, because locking pin 60 will lock up in non-bottoming range of tooth sidewall engagement positions even if the sidewalls of the gear teeth and/or the pin surface erode from wear over a prolonged usage period.

The form and assembly orientation of biasing spring 46 is advantageous in that it is a simple shape and provides a wide flat spring. As arranged in clamped position by U-bracket 52, spring 46 occupies substantially the full width of the space between the U-bracket legs 110 and 112 and slidably bears for its full width against pin 60. Spring 46 thereby provides sufficient force over the wide extent of its engagement with locking pin 60 to make the pin squarely lock into the gear face. Lock spring 46 is also advantageous in that it takes up very little travel space and is easy to mount.

The locking handle pull-up release action is optimized such that the camming angle of slots 130, 132 is preferably about 30°, which by empirical try-out was found best to enable locking pin 60 to be moved with a low manual handle raising force and to produce a smooth motion within the design area available for the components and mechanical action. Note also that the unlocking handles 66 and 68 are designed to be pulled upwardly in order to release pin 60 from locking engagement, instead of being pushed down to accomplish this, thereby avoiding inadvertent unlocking which could occur if the handle could be unlocked by pushing down. This of course, is a desirable safety feature.

Note that handles 66 and 68 are held together in parallel array by three pins 72, 60 and 54, as retained by their respective spring or push-on clips. This three pin mechanism ensures that the alignment of locking pin 60 is maintained as it moves from between locked and unlocked positions. The locking clips and pins are preferably stainless steel, whereas base 40 is a heavy aluminum stamping and U-bracket 52 and gear 80 are aluminum extrusions with finish details machined into the same. However, it is to be understood that gear 80 and cross arm 86 alternatively may be made as a one-piece integral unit by employing die casting or injecting molding processes, if desired. If these casting or molding processes are employed, a fishing rod engagement tab can be molded onto the end face of cross arm 86 to engage the angular alignment groove in fishing rod handle 30 in place of the alignment pin previously described that is inserted through holder holes 176 and 178. The provision of locking grooves in track 22 cooperating with the thumb screws 42 and 44 prevents damage to the sliding surfaces of the track and when the knobs are tightened provides further resistance to rotation from torsional forces applied about the vertical pivot axis. The materials described above are not the only materials of which these mechanisms could be made, i.e., plastic composites, bronzes and stainless steels are examples of some of the materials that could be used.

From the foregoing description, it will now be evident that the principles of construction and operational mode of the invention can be advantageously employed in other mechanisms besides fishing rod holders that advantageously require rotational locking and unlocking action, such as in various seating applications, for example, adjustable seat backs, adjustable seat bottoms and adjustable arm rests. In addition, adjustable tables or platforms could be supported by the adjustment holder mechanism either alone or in combination with a mounting track such as that disclosed and claimed. Accordingly, the invention is not intended to be limited to the particular embodiment disclosed and is intended to cover equivalent structures and mechanisms that may be beyond the literal scope of the present preferred embodiments as illustrated and disclosed herein, but yet within the spirit and intent of the present invention as limited only by the lawfully applicable prior art.

What is claimed is:

1. Adjustable holding apparatus for cantilever support of a pole-like member in various upright orientations, comprising in combination,
   (a) a base plate,
   (b) a pivot bracket mounted upright on said base plate,
   (c) a holder for detachably mounting one end of the pole-like member for cantilever support of the member on and protruding upwardly from said holder,
   (d) a locking gear secured to said holder and pivotally secured to said bracket by a pivot pin for supporting said holder on said base plate for pivotal motion of said holder-mounted member in a generally vertical pivot plane for pivotally raising and lowering the member in said pivot plane, said gear having a circumferentially extending row of locking teeth arrayed in said pivot plane, and
   (e) a locking handle mechanism including a locking pin bodily movable by said mechanism into and out of locking engagement with a selected root space between any two of said teeth for adjustably holding said holder in selected angularly spaced positions in said pivot plane and wherein said locking handle mechanism includes at least one handle arm pivotally mounted to said bracket for pivotal motion of said arm in or parallel to said plane, said bracket having a slot receiving said locking pin therethrough with said locking pin axis parallel to the axis of said bracket gear pivot pin and guiding said locking pin for said gear-engaging and disengaging bodily motion of said locking pin, said arm having a camming slot also receiving said locking pin therethrough and operable to cam said locking pin to produce said pin bodily motion in response to said pivotal motion of said arm.

2. The apparatus of claim 1 wherein said bracket has a pair of spaced-apart parallel legs oriented parallel to said holder first pivot plane, said bracket-gear pivot pin extending between and through said legs and pivotally supporting gear between said legs, said locking pin slot being formed by such a slot formed one in each said leg with said locking pin extending between and through both of said leg locking pin slots, and wherein said locking handle mechanism comprises said one handle arm and a like second handle arm also pivotally mounted to said bracket by said pivot pin, said handle arms flanking the outer side surfaces of said bracket legs, said locking pin extending between and through said camming slot in each handle arm.

3. The apparatus of claim 2 wherein said bracket is formed by extrusion into a U-shaped configuration in transverse cross section with said bracket legs defining the legs of said U-shape and a bite portion integrally joining said legs at the ends thereof remote from said gear, said bracket extrusion having fastener-receiving channels extending therethrough in the extrusion direction and opening along one edge to the interior of the bracket, one of said channels being formed in the bite wall of the U-shaped bracket and the other two channels being formed one at each of the free ends of the legs of said bracket, said channels individually receiving therein a fastener inserted upwardly through a fastener hole in said base plate for attaching said bracket to said base plate.

4. The apparatus set forth in claim 1 wherein said locking pin has a cylindrical outer surface of given constant diameter and wherein said locking gear has a row of bi-directional locking teeth formed with generally radially extending sides defining each of the tooth spaces between adjacent teeth such that bi-directional rotational torque forces exerted on said gear do not tend to force said locking pin out of the tooth space when engaged therein.

5. The apparatus set forth in claim 1 wherein said locking gear has a row of monodirectional locking-ratchet teeth with one side of the space between adjacent teeth being shaped to not cam said locking pin out of engagement in said space in response to rotational torque exerted on said gear tending to lower said holder, the opposite side face of each tooth space being inclined at a camming angle such that raising said holder to exert torque on said gear with a given force causes said locking pin to be cammed out of such tooth engagement, said locking handle mechanism including a spring operable for biasing said locking pin into the next adjacent tooth space as said gear is rotated to bring said adjacent tooth space into registry with said locking pin.

6. The apparatus set forth in claim 1 wherein approximately half of the teeth on said locking gear are bi-directional locking teeth as set forth in claim 5, and the other half of the teeth of said gear are ratchet teeth as set forth in claim 6, whereby said gear can be de-mounted and removed from said bracket and flipped over by rotating the assembly of said holder and gear 180° about the longitudinal axis of said holder so that either the bi-directional locking teeth or the monodirectional locking-ratchet teeth can be selected for operative relationship with the locking pin upon the locking gear being inserted and remounted in the bracket.

7. The apparatus set forth in claim 4 wherein the distance between the sidewalls of said gear locking teeth is coordinated with the diameter of said locking pin so that said pin can enter between these teeth into locking relationship therebetween, but without bottoming or touching the associated root surface between these teeth, thereby ensuring that this non-bottoming, sidewall seating action eliminates play in the rod holder once locked, while at the same time compensating for the effects of wear of said locking pin on the two pin-engaged tooth sidewalls during prolonged usage so that this anti-play feature is preserved over a long operating life of the rod holder.

8. The apparatus set forth in claim 5 wherein the distance between the sidewalls of said gear locking teeth is coordinated with the diameter of said locking pin so that said pin can enter between these teeth into locking relationship therebetween, but without bottoming or touching the associated root surface between these teeth, thereby ensuring that this non-bottoming, sidewall seating action eliminates play in the rod holder once locked, well at the same time compensating for the effects of wear of said locking pin on the two pin-engaged tooth sidewalls during prolonged usage so that this anti-play feature is preserved over a long operating life of the rod holder.

9. The apparatus set forth in claim 6 wherein the distance between the sidewalls of said gear locking teeth is coordinated with the diameter of said locking pin so that said pin can enter between these teeth into locking relationship therebetween, but without bottoming or touching the associated root surface between these teeth, thereby ensuring that this non-bottoming, sidewall seating action eliminates play in the rod holder once locked, well at the same time compensating for the effects of wear of said locking pin on the two pin-engaged tooth sidewalls during prolonged usage so that this anti-play feature is preserved over a long operating life of the rod holder.

10. The apparatus set forth in claim 1 wherein said base plate is adjustably fixed to an elongate mounting track and may be slid along said track longitudinally thereof to change the position of said holder apparatus along said track, and said base plate constructed and arranged for rotational adjustment on said track such that said rod holder can be swung from sideways through an adjustment angle, as well as being pivotable up and down.

11. The apparatus set forth in claim 10 wherein said track is made as an extrusion and comprises a base portion having a flat bottom wall flanked by laterally opposite upright sidewall portions that terminate at their upper edge at inturned lips, the mutually facing end edges of said lips being spaced apart a distance slightly greater than the maximum horizontal dimension of said bracket, the upper surface of said track base portion bottom wall being made up of a series of parallel alternating grooves and lands with the upper surfaces of said lands being coplanar with one another and with the end edges of the upper surface of said bottom wall of said track base portion, said lips having undersurfaces spaced above the upper surface of the base portion by a distance designed to receive the thickness of the base plate with a relatively close clearance sliding fit whereby the undersurface of said base is adapted to slide along and on said lands and along and on the portions of the upper surface of the end edges of the upper wall of the base whereby said lips capture said base plate against upward release from said track in any rotational operational position of said base plate on said track.

12. The apparatus set forth in claim 11 wherein the configuration of said base plate in plan view is a modified diamond or "oblong" shape and has thumbscrew mounting holes aligned along the major axis of said base plate, the major longitudinal axis of said bracket lying in the pivot plane of said holder and being oriented perpendicular to the major axis of said base plate, the diametrically opposite first pair of ends of said base plate located along its major axis being curved in plan view with a minor radius of curvature, whereas the diametrically opposite second pair of ends of said base plate intersected by its minor axis are curves having a larger radius of curvature than said first pair of ends and are coincident with an imaginary circle whose diameter is only slightly less than the distance between the interior surfaces of the lips of said track, said base plate having locking knobs mounted one in each of said locking holes and being disposed adjacent said first pair of curved ends of said base plate, whereby said base plate is capable of rotation while being constantly captured by the track lips against upward release from the track, said base being lockable in selected angularly spaced positions in said range of rotation on said track by screwing said thumbscrews down into the grooves between lands on the bottom wall upper surface of said track.

13. The apparatus set forth in claim 2 wherein the camming angle of the slots in said handle arms is preferably about 30° to thereby enable said locking pin to be moved with a low manual handle raising force and to produce a smooth action within the design area available for said components and the cooperative mechanical action therebetween.

\* \* \* \* \*